(12) United States Patent
Edwards et al.

(10) Patent No.: US 10,593,136 B2
(45) Date of Patent: *Mar. 17, 2020

(54) SYSTEMS AND METHODS FOR USING MOTION PATTERN OF A USER FOR AUTHENTICATION

(71) Applicant: Capital One Services, LLC, McLean, VA (US)

(72) Inventors: Joshua Edwards, Philadelphia, PA (US); Michael Mossoba, Arlington, VA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,410

(22) Filed: May 9, 2019

(65) Prior Publication Data

US 2020/0027293 A1    Jan. 23, 2020

Related U.S. Application Data

(63) Continuation of application No. 16/040,210, filed on Jul. 19, 2018.

(51) Int. Cl.
| | |
|---|---|
| H04B 7/00 | (2006.01) |
| G07C 9/00 | (2020.01) |
| G06F 3/0346 | (2013.01) |
| G06F 21/34 | (2013.01) |
| G06F 3/01 | (2006.01) |

(52) U.S. Cl.
CPC ......... *G07C 9/00071* (2013.01); *G06F 3/017* (2013.01); *G06F 3/0346* (2013.01); *G06F 21/34* (2013.01)

(58) Field of Classification Search
CPC ... G07C 9/00071; G06F 3/017; G06F 3/0346; G06F 21/34
See application file for complete search history.

(56) References Cited

U.S. PATENT DOCUMENTS

| | | | |
|---|---|---|---|
| 6,721,738 | B2 | 4/2004 | Verplaetse et al. |
| 8,643,475 | B1 | 2/2014 | Kohno et al. |
| 9,426,139 | B1 | 8/2016 | McClintock et al. |
| 9,762,581 | B1 | 9/2017 | Wang et al. |
| 10,108,272 | B1 * | 10/2018 | DeBates ................ G06F 3/017 |
| 2008/0175443 | A1 | 7/2008 | Kahn et al. |
| 2010/0214216 | A1 | 8/2010 | Nasiri et al. |
| 2010/0328201 | A1 | 12/2010 | Marvit et al. |
| 2011/0159850 | A1 | 6/2011 | Faith et al. |
| 2011/0189981 | A1 | 8/2011 | Faith et al. |
| 2012/0124662 | A1 | 5/2012 | Baca et al. |
| 2013/0167221 | A1 | 6/2013 | Vukoszavlyev et al. |
| 2013/0228616 | A1 | 9/2013 | Bhosle et al. |
| 2013/0234836 | A1 * | 9/2013 | Davis ..................... H04L 63/10 |
| | | | 340/10.5 |

(Continued)

*Primary Examiner* — Munear T Akki
(74) *Attorney, Agent, or Firm* — Finnegan, Henderson, Farabow, Garrett & Dunner LLP

(57) ABSTRACT

Systems and methods for using accelerations derived from a motion pattern for multi-factor authentication, the method including receiving, filtering, and determining an identifying pattern from acceleration data representative of the user and using the identifying pattern for secured access authentication.

20 Claims, 6 Drawing Sheets

(56) References Cited

U.S. PATENT DOCUMENTS

| | | |
|---|---|---|
| 2014/0049361 A1 | 2/2014 | Ahearn et al. |
| 2015/0109124 A1 | 4/2015 | He et al. |
| 2015/0112603 A1 | 4/2015 | Zhong |
| 2015/0325066 A1 | 11/2015 | Muller |
| 2016/0307189 A1 | 10/2016 | Zarakas et al. |
| 2017/0148243 A1 | 5/2017 | Shin et al. |
| 2017/0242992 A1* | 8/2017 | Olofsson ............... G06F 21/316 |
| 2017/0323166 A1 | 11/2017 | Colussi et al. |
| 2018/0268628 A1 | 9/2018 | Jain et al. |

* cited by examiner

SYSTEMS AND METHODS FOR USING MOTION PATTERN OF A USER FOR AUTHENTICATION

CROSS-REFERENCE TO RELATED APPLICATIONS

This application is a continuation of U.S. application Ser. No. 16/040,210, filed Jul. 19, 2018, now pending, which is incorporated herein by reference in its entirety.

TECHNICAL FIELD

The disclosed embodiments generally relate to systems and methods for using a motion pattern of a user as an identification factor for secured access authentication.

BACKGROUND

Multi-factor authentication is a method of confirming a user's identity only after successfully presenting two or more factors to an authentication mechanism. The factors may include: knowledge, something the user and only the user knows; possession, something the user and only the user has; and inherence, something the user and only the user is. Two-factor authentication is one type of multi-factor authentication. It is a method of confirming a user's claimed identity by utilizing a combination of two factors. For example, a two factor authentication may be required for withdrawing money from an automated teller machine: only the correct combination of a bank card, something that the user possesses, and a personal identification number, something that the user knows, allows the automated teller transaction to be carried out.

As something inherent to the user, biometric factors are being increasingly used as one factor in a multi-factor authentication process because biometrics cannot easily be replicated or stolen by a third party. Physical attributes like voice, smell, fingerprints, heartbeats, facial recognition, hand geometry, and retina scanning are examples of currently used biometric factors.

A physical access control system is one way to protect people, property and assets, by tracking and restricting door or gate entry to a property, building, or room to authorized persons. Key cards and key fobs that unlock doors are common access control systems providing the ability to restrict access to authorized possessors of the key cards or fobs. Many organizations utilize access cards for employees to enter restricted areas. Access cards, however, can be easily hacked. Many inexpensive devices are available for any person to purchase, potentially giving many people the ability to steal and replicate key cards. While many business and other institutions have robust security for their servers and data clouds, they often overlook the possibility that an unauthorized person may replicate an access card and enter their premises. There is currently a need for improved security for using access cards.

SUMMARY

In one embodiment, a system for authenticating secured access includes one or more memory devices storing instructions, one or more processors configured to execute the instructions to: receive, from an access card, acceleration data associated with a motion pattern of an access card, the motion pattern being performed by a user having the access card, filter the received acceleration data, the filtered acceleration data being representative of the user, determine an identifying pattern from the filtered acceleration data, compare the determined identifying pattern of the user with a reference identifying pattern, and authenticate an identity of the user based on the comparison between the determined identifying pattern and the reference identifying pattern.

In another embodiment, a method for authenticating secured access includes receiving acceleration data associated with a motion pattern of an access card, the motion pattern being performed by a user having the access card, filtering the received acceleration data, the filtered acceleration data being representative of the user, determining an identifying pattern from the filtered acceleration data, comparing the determined identifying pattern of the user with a reference identifying pattern, and authenticating an identity of the user based on the comparison between the determined identifying pattern and the reference identifying pattern.

In another embodiment, a non-transitory computer-readable storage medium storing instructions that are executable by at least one processor to authenticate secured access. The instructions, when executed by a processor, cause the computer to perform the steps of receiving, acceleration data associated with a motion pattern of an access card, the motion pattern being performed by a user having the access card, filtering the received data, the filtered acceleration data being representative of the user, determining an identifying pattern from the filtered acceleration data, comparing the determined identifying pattern of the user with a reference identifying pattern, and authenticating an identity of the user based on the comparison between the determined identifying pattern and the reference identifying pattern.

BRIEF DESCRIPTION OF THE DRAWING

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying figures. The disclosed systems and methods relate to using motion patterns as a biometric identification factor for authentication using an electronic access card.

The term "access card," as used herein may refer to a physical product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of access cards may also include transaction cards, such as credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet various international standards, including, e.g., ISO/IEC 7810, ISO/IEC 7811, ISO/IEC 7812, ISO/IEC 7813, ISO/ISC 7816, ISO 8583, ISO/IEC 4909, and ISO/IEC 14443. For example, a transaction card may have dimensions of 85.60 mm (width) by 53.98 mm (height) by 0.76 mm (thickness), as specified in ISO/IEC 7810.

Disclosed embodiments include systems and methods for authenticating secured access using an access card and a secured access device. For example, an access card may be used to restrict access to a secured location to authorized persons.

Figure 1:
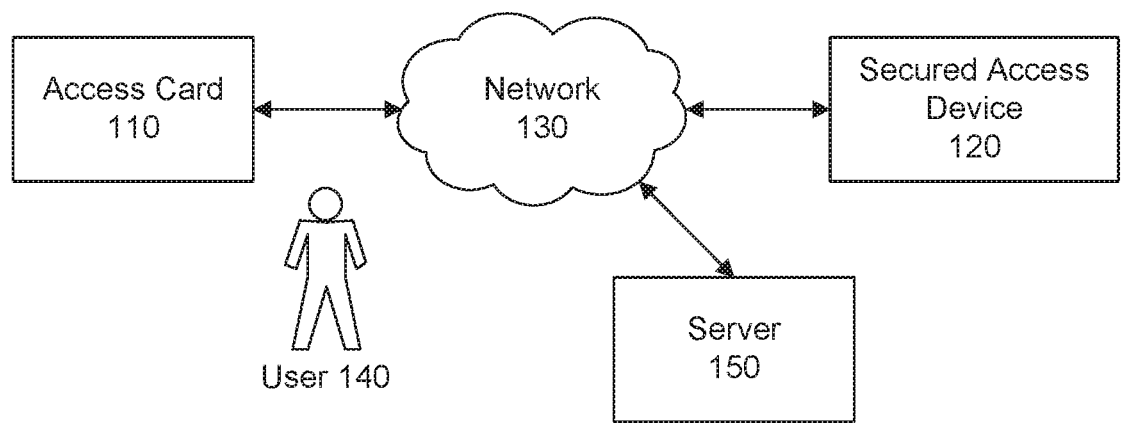
FIG. 1 is a block diagram of an exemplary system, consistent with disclosed embodiments.

FIG. 1 is a block diagram illustrating an exemplary system 100 that may be configured for performing authentication consistent with disclosed embodiments. As shown, system 100 includes an access card 110, a secured access device 120, and a server 150, which are communicatively coupled by a network 130. Access card 110 is for use by a user 140 to be authenticated by secured access device 120 for access to a secured location. While only one access card 110 and secured access device 120 are shown, it will be understood that system 100 may include more than one access card 110, secured access device 120, and user 140.

Each of access card 110, secured access device 120, and server 150 may be a computing system configured to provide, use, and/or process user data. As further described herein, access card 110, secured access device 120, and server 150 may include one or more computing devices (e.g., computer(s), server(s), embedded systems), and memory storing data and/or software instructions (e.g., database(s), memory devices). In some embodiments, the one or more computing devices are configured to execute software instructions stored on one or more memory devices to perform one or more operations consistent with the disclosed embodiments. Access card 110 and secured access device 120 may be configured to communicate with each other. In certain aspects, secured access device 120 may communicate with other systems or computing devices. In certain aspects, users may operate one or more of devices 110 and 120 to initiate one or more operations consistent with disclosed embodiments. For example, access card 110 may be operated by user 140. User 140 may be an owner/operator of access card 110 and/or secured access device 120, such as a customer or employee of one or more entities associated with secured access device 120. In other aspects, user 140 may be an employee of, or associated with, an entity corresponding to access card 110 and/or secured access device 120, e.g., someone authorized to use underlying computer systems or otherwise act on behalf of the entity. In other aspects, user 140 may not be an employee or otherwise associated with the underlying entity. In some aspects, user 140 may be an entity, rather than an individual(s), associated with the secured access device 120.

Access card 110 may be associated with user 140. In some embodiments, access card 110 may include software that, when executed by a processor, performs known internet-related communication processes. In some embodiments, access card 110 may include a data storage component disposed in the card. As used herein, a "data storage component" may be or include one or more devices configured to receive, store, process, provide, transfer, send, delete, and/or generate data or other information. For example, the data storage component may include a microchip (e.g., EMV chip), a communication component or device (e.g., Near Field Communication (NFC) antenna, radiofrequency identification (RFID) device, Bluetooth® device, WiFi device), a magnetic strip, a barcode, a Quick Response (QR) code, and/or other devices. The data storage component may be configured to store information in a computer-readable format. For example, the data storage component may be configured to store information in a format that can be read by secured access device 120.

Secured access device 120 may be associated with any entity that requires security, for example, an entity that regulates the entry/exit of persons from a secured location. The entity may be a financial service provider, which may be a bank, credit union, credit card issuer, or other type of financial service entity that generates, provides, manages, and/or maintains financial service accounts for one or more customers. The entity may be any provider of goods and/or services. For example, the entity may be a hospital, university, business, gated community, apartment complex, self-storage, and/or school, among other entities. The entity associated with secured access device 120 may issue access card(s) to one or more user(s) 140.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 100. In other embodiments, one or more components of system 100 may communicate directly through a dedicated communication link(s) (not shown), such as a link between access card 110 and secured access device 120.

Server 150 may include one or more processors, one or more memories, and one or more input/output devices. According to some embodiments, server 150 may be an embedded system or similar computing device consistent with disclosed embodiments.

Figure 2:
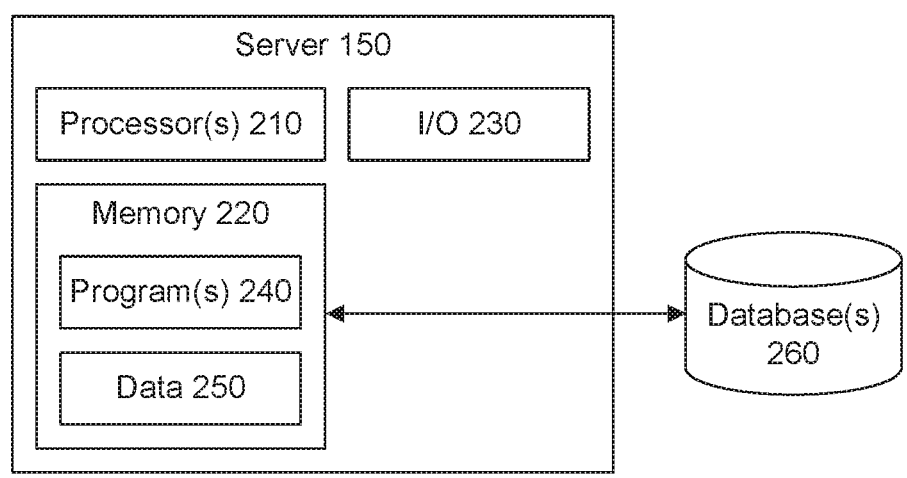
FIG. 2 is a block diagram of an exemplary server, consistent with disclosed embodiments.

FIG. 2 is an exemplary block diagram of server 150 for implementing embodiments consistent with the present disclosure. Variations of server 150 may be used by access card 110 and secured access device 120.

In one embodiment, server 150 includes one or more processors 210, one or more memories 220, and one or more input/output (I/O) devices 230. According to some embodiments, server 150 may be an embedded system or similar computing device consistent with disclosed embodiments. Server 150 may be standalone, or it may be part of a subsystem, which may be part of a larger system. For example, server 150 may represent distributed servers that are remotely located and communicate over a network (e.g., network 130) or a dedicated network, such as a LAN. Server 150 may communicate with secured access device 120 and/or access card 110.

Processor 210 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor 210 may include one or more known digital signal processors (DSP). DPSs may include, among others, ASOCS ModemX processors, CEVA XC4000 processors, OMAP3 processors, ARM Cortex-A8 and C6000 processors, and DSP Microchip Technology PIC24 based dsPIC processors.

Memory 220 may include one or more storage devices configured to store instructions used by processor 210 to perform functions related to disclosed embodiments. For example, memory 220 may be configured with one or more software instructions, such as program(s) 240 that may perform one or more operations when executed by processor 210. The disclosed embodiments are not limited to separate programs or computers configured to perform dedicated tasks. For example, memory 220 may include a single program 240 that embodies the functions of server 150, or program 240 could comprise multiple programs. Additionally, processor 210 may execute one or more programs located remotely from server 150. For example, secured access device 120 may, via server 150, access one or more remote programs that, when executed, perform functions related to certain disclosed embodiments. Memory 220 may also store data 250 that reflects any type of information in any format that server 150 may use in system 100 to perform operations consistent with the disclosed embodiments.

I/O device 230 may be one or more devices configured to allow data to be received and/or transmitted by server 150. I/O devices 230 may include one or more digital and/or analog communication devices that allow server 150 to communicate with other machines and devices, such as other components of system 100. For example, I/O device may be a general purpose computer used for sending and receiving data through network 130 to and from access card 110 and/or secured access device 120.

Server 150 may also be communicatively connected to one or more database(s) 260. Server 150 may be communicatively connected to database(s) 260 through network 130. Database 260 may include one or more memory devices that store information and are accessed and/or managed through server 150. By way of example, database(s) 260 may include Oracle™ databases, Sybase™ database, or other relational databases or non-relational databases, such as Hadoop sequences files, HBase, or Cassandra. The databases or other files may include, for example, data and information related to the source and destination of a network request, the data contained in the request, etc. Systems and methods of the disclosed embodiments, however, are not limited to separate databases. In one aspect, server 150 may include database 260. Alternatively, database 260 may be located remotely from server 150. Database 260 may include computing components (e.g., database management system, database server, etc.) configured to receive and process requests for data stored in memory devices of database(s) 260 and to provide data from database 260.

Figure 3:
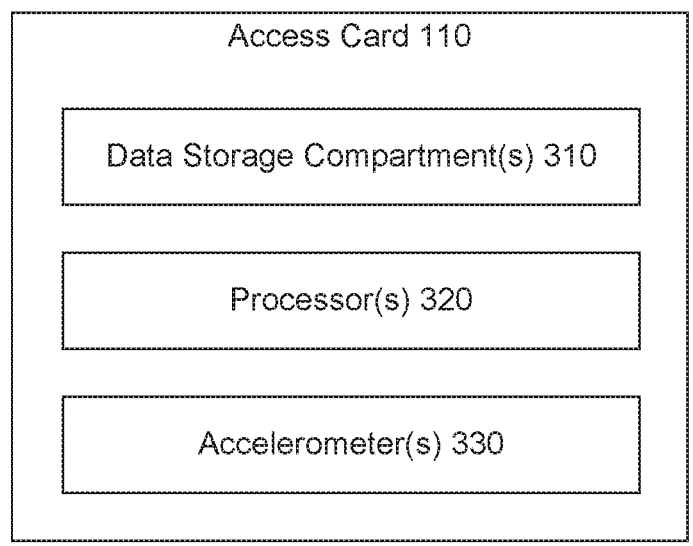
FIG. 3 is a block diagram of an exemplary access card, consistent with disclosed embodiments.

FIG. 3 is an exemplary block diagram of access card 110 for implementing embodiments consistent with the present disclosure. In some embodiments, access card 110 may include one or more data storage components 310, and one or more processors 320, and one or more accelerometers 330 disposed in the card. As used herein, a "data storage component" may be or include one or more devices configured to receive, store, process, provide, transfer, send, delete, and/or generate data or other information. For example, data storage component 310 may include a microchip (e.g., EMV chip), a communication component or device (e.g., Near Field Communication (NFC) antenna, radiofrequency identification (RFID) device, Bluetooth® device, WiFi device), a magnetic strip, a barcode, a Quick Response (QR) code, and/or other devices. Data storage component 310 may be configured to store information in a computer-readable format. For example, data storage device may be configured to store information in a format that can be read by secured access device 120.

Processor(s) 320 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 320 may include one or more known digital signal processors (DSP). DPSs may include, among others, ASOCS ModemX processors, CEVA XC4000 processors, OMAP3 processors, ARM Cortex-A8 and C6000 processors, and DSP Microchip Technology PIC24 based dsPIC.

Accelerometer 330 may include one or more known accelerometers, such as micro electro mechanical (MEM) accelerometers. Accelerometer 330 may, for example, include an NXP MMA8451Q accelerometer or variants of the NXP MMA8451Q accelerometer.

Figure 4:
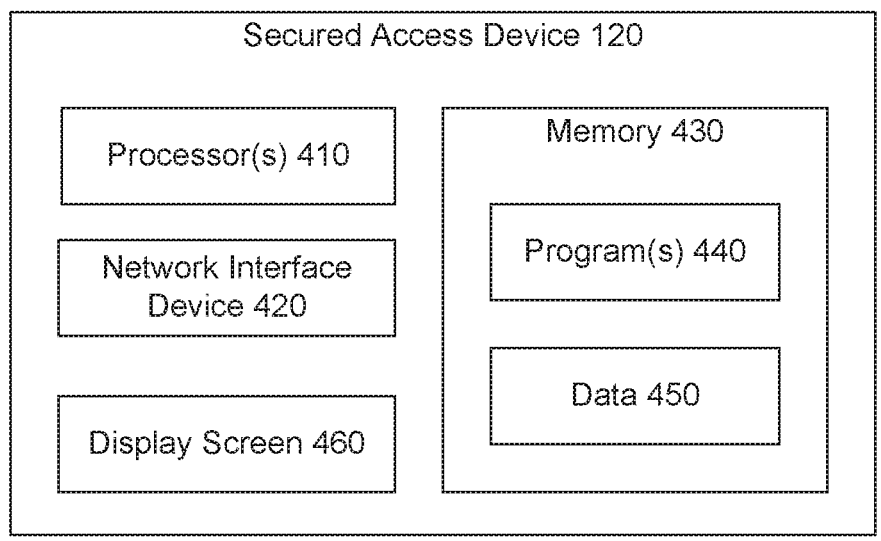
FIG. 4 is a block diagram of an exemplary secured access device, consistent with disclosed embodiments.

FIG. 4 is an exemplary block diagram of secured access device 120 for implementing embodiments consistent with the present disclosure. In one embodiment, secured access device includes one or more processors 410, a network interface device 420, a memory 430, one or more programs 440, data 450, and a display screen 460.

Processor 410 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor 410 may include one or more known digital signal processors (DSP). DPSs may include ASOCS ModemX processors, CEVA XC4000 processors, OMAP3 processors, ARM Cortex-A8 and C6000 processors, and Microchip Technology PIC24 based dsPIC processors. The disclosed embodiments are not limited to any type of processor(s) otherwise configured to meet the computing demands required of different components of secured access device 120.

Network interface 420 allows secured access device 120 to send and receive information through network 130. Alternatively or additionally, network interface 420 may establish direct wired or wireless connection between secured access device 120 and other system components, such as server 150 or access card 110. In some embodiments, network interface 420 may establish direct wired or wireless connection between secured access device 120 and other computing devices. For example, network interface device 420 may communicatively couple secured access device 120 to computing devices associated with door locking mechanisms. For example, secured access device 120 may be communicatively coupled to a computing system associated with an electronic deadbolt door lock, or electronic magnetic door lock. Network interface 420 may include a microchip (e.g., an EMV chip), a communication component or device (e.g., Near Field Communication (NFC) antenna, radiofrequency identification (RFID) device, Bluetooth® device, WiFi device), a magnetic strip, a barcode, a Quick Response (QR) code, and/or other devices.

Memory 430 may include one or more storage devices configured to store instructions used by processor 410 to perform functions related to disclosed embodiments. For example, memory 430 may be configured with one or more software instructions, such as program(s) 440 that perform one or more operations when executed by processor 410. The disclosed embodiments are not limited to separate programs or computers configured to perform dedicated tasks. For example, memory 430 may include a single program(s) 440 that embodies the functions of secured access device 120, or program 440 could comprise multiple programs. Additionally, processor 410 may execute one or more programs located remotely from secured access device 120. For example, access card 110 and secured access device 120 may, via server 150, access one or more remote programs that, when executed, perform functions related to certain disclosed embodiments. Memory 430 may also store data 450 that reflects any type of information in any format that secured access device 120 may use in system 100 to perform operations consistent with disclosed embodiments.

Secured access device 120 may include a display screen 460, such as, for example, a liquid crystal display (LCD), a light emitting diode screen (LED), an organic light emitting diode screens (OLED), a touch screen, or other known display screens. Display screen 460 may display various kinds of information consistent with disclosed embodiments.

Figure 5:
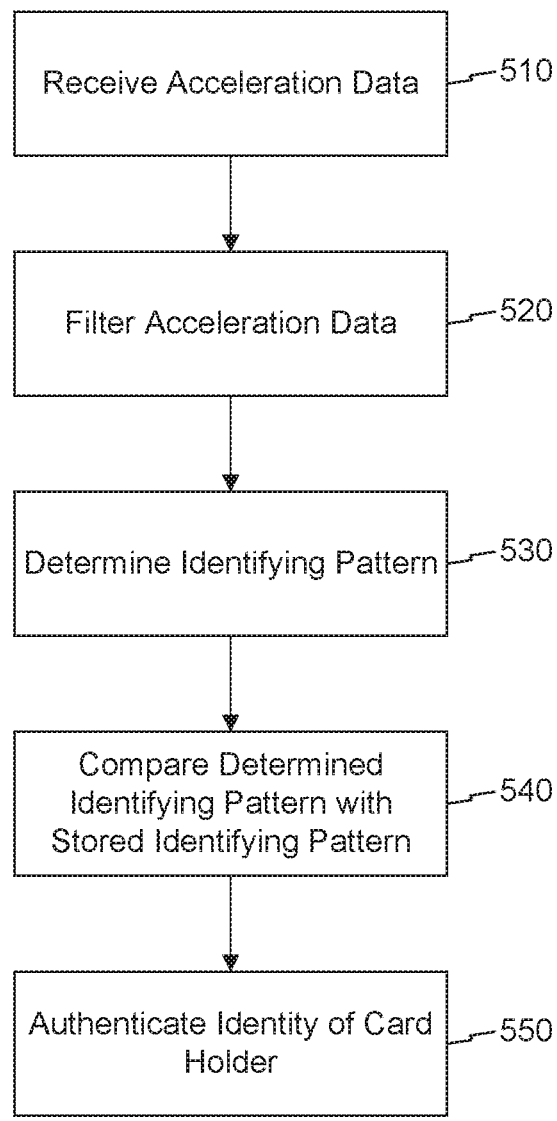
FIG. 5 is a flow chart of an exemplary process for authenticating a user, consistent with disclosed embodiments.

FIG. 5 is a flow chart of an exemplary process 500 performed by secure access device 120 for authenticating user 140. It should be understood, however, that the disclosed embodiments are not limited to the processes disclosed herein, and may apply to other authentication events. The exemplary disclosed embodiments may be applicable to any service provided to user 140 where the identity of user 140 is authenticated. For example, the identity of user 140 may be authenticated for a financial transaction, gaining secured access, sending or receiving confidential information, etc.

Process 500 includes secured access device 120 receiving acceleration data associated with the movement of access card 110 when user 140 performs a gesture for purposes of authentication of user 140's identity (step 510). Prior to step 510, user 140 may approach a locked door that only authorized persons are allowed to enter. Upon approaching the door, user 140 may, for example, hold access card 110 in their hand or simply carry access card 110 on their person, perform a gesture with their hand holding access card 110 or a full body gesture, in order to authenticate their identity and thereby unlock the door and cross the door's threshold.

In some embodiments, data storage component(s) 310 disposed in access card 110 sends acceleration data corresponding to the gesture by user 140 to secured access device 120. In some embodiments, user 140 will possess access card 110 and perform a gesture, which may be a fully body gesture. For example, user 140 may hold access card 110 in their hand, and draw a shape, a signature, a code word, or a motion that only user 140 knows and only user 140 can perform reproducibly. For example, a hand written signature is one such gesture that only user 140 can perform reproducibly. Hand writing and written signatures are regarded as individual to a person. In certain aspects, user 140 may carry access card 110 in their pocket and perform one or more squats as their gesture. The acceleration data derived from user 140 performing the gesture while possessing access card 110 is transferred by data storage component(s) 310 to secured access device 120. In some embodiments, access card 110 communicates via data storage component(s) 310 with secured access device 120 through network 130. Alternatively, for example, access card 110 and secured access device 120 may directly communicate through Bluetooth modules respectively included in access card 110 and secured access device 120.

The acceleration data derived from user 140's gesture while possessing access card 110 functions as a biometric authentication factor. This is another factor in addition to, for example, possession of access card 110 for use in multi-factor authentication. For example, if user 140 signs their name in the air while holding access card 110 in their hand, the acceleration data derived therefrom can be manipulated, e.g., filtered and an identifying pattern determined therefrom, consistent with the present disclosure, to serve as a biometric factor, providing a factor in addition to possession of access card 110 for authentication. For example, the acceleration data may be filtered by access card 110 or secured access device 120. Because no two people are built exactly alike, nor do they move exactly the same, the movement of the gesture by user 140 associated with access card 110 will have accelerations per unit of time unique to user 140.

In some embodiments, user 140 may approach a security check point which includes a door and a door locking mechanism associated with secured access device 120. Secured access device 120 may display a message on display screen 460 prompting user 140 to authenticate themselves. User 140 may then perform their gesture while possessing access card 110. By simply asking user 140 to authenticate themselves, an unauthorized third party who may have gained unauthorized possession of access card 110 may not know that a gesture is required for authentication. This knowledge of the gesture can also function as an additional factor in the multi-factor authentication.

In some embodiments, the acceleration data transferred from access card 110 is raw, i.e., has not been processed by processor(s) 320. In such embodiments, the raw acceleration data is filtered by secured access device 120 (step 520). Processor(s) 410 can filter the acceleration data derived from user 140's gesture, for example, by digital signal processing. Processor(s) 410 may therefore include a digital signal processor. For example, the raw acceleration data may include additional acceleration data that is not representative of user 140's full body gesture. Such data may be, for example, generated from accelerations associated with user 140's environment and/or the environment surrounding secured access device 120, which may include, for example, accelerations data generated from a building's heating, ventilation, and air-conditioning system. The acceleration data may be filtered, so that only accelerations resulting from user 140's gesture are collected and processed, for example by using stock linear quadratic estimation, commonly known as Kalman filtering.

The filtered acceleration data is normalized in the time domain and frequency domain. The normalized acceleration data creates a data set of individual time based acceleration vectors which can be codified by assembling the acceleration data into normalized Hausdorff space patterns, which are representative of user 140's gesture and ultimately representative of user 140's identity. The filtered acceleration data derived from the full body gesture performed by user 140 while possessing access card 110 constitutes a determined identifying pattern (step 530). This determined identifying pattern can function as one factor in a multi factor authentication.

In other embodiments, processor(s) 320 of access card 110 may filter the raw acceleration data in the manner described above. Access card 110 would then transfer the filtered acceleration data, to secured access device 120 and secured access device 120 may determine the identifying pattern. Alternatively, access card 110 may filter the raw acceleration data and determine the identifying pattern, and then send the identifying pattern to secured access device 120.

Process 500 continues by comparing the identifying pattern derived from the gesture with an identifying pattern associated with user 140 that is stored in memory 430 in the secured access device 120 (step 540) and/or in memory 220 and/or database(s) 260 associated with server 150. Based on a comparison between the stored identifying pattern and the determined identifying pattern, user 140 may be authenticated (step 550). In some embodiments, processor 210 or 410 executes software instructions to compare the determined identifying pattern with the stored identifying pattern. In certain aspects, the comparison must be within a predetermined confidence level, e.g., of 75%, 80%, 85%, 90%, 95%, or 99% to authenticate the identity of user 140. For example, the determined identifying pattern must be compared to the stored identifying pattern and be within a predetermined confidence level in order to authenticate user 140.

In various embodiments, processor(s) 410 of secured access device 120 may execute machine learning software when determining the identifying pattern. In some embodiments, technology used for this purpose may include Neural Networks, Hidden Markov Models, and Support Vector Machines. In various embodiments, acceleration data, associated with user 140's movement of access card 110, may be measured by access card 110 and converted into a vector in three-dimensional space. In some embodiments, timing associated with user 140's movement of access card 110 and/or individual gestures may be monitored to determine a uniformity (and/or one or more levels of uniformity) within the movement of each individual identifying pattern. For example, if the identifying pattern had a confidence level over a predetermined threshold, for example 75% or 90%, that the gesture was properly performed, then user 140 could be authenticated. In other embodiments, the user is prompted to repeat the gesture when the identifying pattern does not meet the confidence level over a predetermined threshold. In other embodiments, each time user 140 authenticated their identity, the filtered acceleration data could be stored in memory 430 associated with secured access device 120 and/or memory 220 associated with server 150 and used to refine step 540. For example, the filtered acceleration data and determined identifying pattern may be stored in memory, such that each successive determined identifying pattern may be used as continued input in training the machine learning model for variations. In other embodiments, the filtered acceleration data and identifying pattern may only be added as inputs to the machine learning model when exceeding a certain threshold of confidence. In this manner, the secured access device 120 can become more accurate over time in its determination of whether user 140 is truly the entity performing the gesture.

Figure 6:
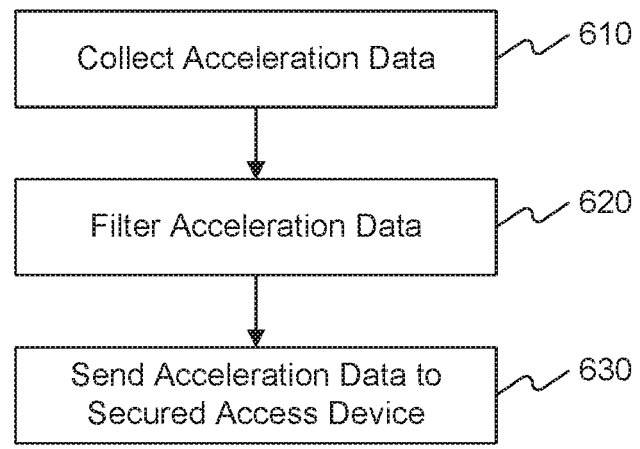
FIG. 6. is a flow chart of an exemplary process performed by access card 110, consistent with disclosed embodiments.

FIG. 6 is a flow chart of an exemplary process 600 performed by access card 110 for sending acceleration data derived from a motion pattern of user 140 for authentication, consistent with disclosed embodiments.

Access card 110 may collect acceleration data via one or more accelerometers 330 (step 610). Prior to step 610, user 140 may approach a locked door that only authorized persons are allowed to enter. Upon approaching the door, user 140 may, for example, hold access card 110 in their hand or simply carry access card 110 on their person, perform a gesture with their hand holding access card 110 or a full body gesture, in order to authenticate their identity and thereby unlock the door and cross the door's threshold. Accelerometer(s) 330 may collect the accelerations associated with the movement of access card 110 while the gesture or full body pattern is being performed by user 140.

In some embodiments, access card 110 may filter the raw acceleration data collected in step 610 (step 620). For example, processor(s) 320 may filter the raw acceleration data as described above. After the raw acceleration data is filtered by processor(s) 320 on access card 110, the filtered acceleration data may be sent to secured access device 120 (step 630). Additionally or alternatively, processor(s) 320 may execute software instructions to determine an identifying pattern from the filtered acceleration data, which can subsequently be transferred to secured access device 120. In some embodiments, the identifying pattern is stored in data storage component 310 of access card 110, thereby allowing access card 110 to perform steps 510-550.

Alternatively, the acceleration data may be filtered (step 620) by processors 410 or 210 after the collected acceleration data is sent by data storage component(s) 310 of access card 110 to secured access device 120 or server 150, respectively.

In some embodiments, the stored identifying patterns are stored in memory 430 of secured access device 120 and/or memory 220 of server 150. Multiple identifying patterns respectively associated with multiple users possessing multiple access cards may be stored in memory 430 of secured access device 120 and/or memory 220 of server 150.

In some embodiments, processor(s) 410 or 210 execute software instructions to compare the determined identifying pattern and the stored identifying pattern.

In some embodiments, secured access device 120 is associated with a door locking mechanism, such that secured access device 120 is able to lock and unlock a door associated with the door locking mechanism. For example, user 140 may approach a door whose locking mechanism is communicatively coupled to secured access device 120. The door locking mechanism may be communicatively coupled to secured access device through network 130 and/or components of server 150, or other direct communication means including hardwired connection. In some embodiments, secured access device 120 may prompt user 140 to perform the identifying gesture with access card 110. For example, secured access device 120 may display a message on display screen 460 asking user 140 to perform the identifying gesture with access card 110. The message may be displayed upon secured access device 120 communicating with access card 110, for example through Bluetooth modules. In response, user 140 may perform their identifying gesture and be authenticated consistent with the disclosed embodiments. Upon authentication, secured access device 120 may send instructions to the door locking mechanism to unlock the door.

In some embodiments, the door locking mechanism may be an electromagnetic lock, magnetic lock, or maglock, which includes an electromagnet and an armature plate. In some embodiments, the locking mechanism can be either "fail safe," which are unlocked when power is lost or "fail secure," which remain locked when power is lost. The "fail safe" magnetic lock requires power to remain locked and typically is not suitable for high security applications because it is possible to disable the lock by disrupting the power supply. Despite this, by adding a magnetic bond sensor to the lock and by using a power supply that includes a battery backup capability, some specialized higher security applications can be implemented. Magnetic locks possess a number of advantages over conventional locks, for example, their durability and quick operation are particularly suitable for high-traffic environments where electronic authentication is necessary.

In some embodiments, the electromagnet portion of the lock is attached to the door frame and an armature plate is attached to the door. The two components are in contact when the door is closed. When the electromagnet is energized, a current passing through the electromagnet creates a magnetic flux that causes the armature plate to attract to the electromagnet, creating a locking action. Because the mating area of the electromagnet and armature is relatively large, the force created by the magnetic flux is strong enough to keep the door locked. In some embodiments, the electromagnetic lock has a holding force capacity of 600 pounds. In other embodiments, the holding force capacity is 1,200 pounds or 2,000 pounds or more. Because electromagnetic locks do not interact with levers or door knobs on a door, typically a separate release button that cuts the lock power supply is mounted on the secured side of the door. The button usually has a timer that, once pressed, keeps the lock unlocked for a short period of time to enable exit from the secured side. For example, pressing the button may leave the door unlocked for less than five seconds, 10 seconds, 15 seconds or more.

In some embodiments, the magnetic lock is part of an electronic security system. Such a system may include secured access device 120 communicatively coupled to an electromagnetic door locking mechanism and access card 110.

In various embodiments, user 140 may initially configure their identifying gesture. For example, user 140 may interact with access card 110 and secured access device 120 through components of server 150 to configure an identifying gesture. For example, user 140 may perform the identifying gesture with access card 110 repeatedly. The repeated performance of the gesture will set the maximum and minimums for measured accelerations and time. During the initial configuration, access card 110 would collect acceleration data associated with the gesture. Access card 110 may then transfer the acceleration data to secured access device 120 and/or components of server 150. Access card 110 may process the raw acceleration data prior to transferring the data. For example, processor(s) 320 may filter the acceleration data collected by accelerometer(s) 330 and processor(s) 320 may determine an identifying pattern and send the identifying pattern to secured access device 120 or server 150. During the configuration process, the maximum and minimum accelerations, as well as the time length of each gesture can be recorded. Additionally, accelerations due to the rotation of access card 110 may be collected. For example, accelerations measured from the movement of access card 110 may vary depending on the location of accelerometer(s) 330. The location of accelerometer(s) 330 may be accounted for during the filtering process. For example, user 140 may be instructed to hold their card in a variety of ways (e.g., upside down, backwards, etc.), while performing the initial gesture, to inform secured access device 120 of how the gesture would be performed with different variations of the placement of the accelerometers. In some embodiments, the location of the one or more accelerometers 330 on access card 110 may be considered when configuring the identifying pattern. In some aspects, the rotational acceleration may differ depending on the location of the one or more accelerometer(s) 330. Filtering process 520 may account for the variation in rotational acceleration due to the location of the one or more accelerometers 330. For instance, if the accelerometer 330 were on the bottom of access card 110, and user 140 performed a gesture in which they rotated access card 110 vertically using the bottom of access card 110 as the rotational axis, the data sent to secured access device 120 would have a smaller rotational circle than if the same gesture were performed with accelerometer 330 placed on the top of access card 110 (or if access card 110 were held upside down when the gesture was performed). Filtering process 520 may have a step to normalize these rotations. In other embodiments, user 140 performing the identifying gesture while holding access card 110 in a variety of ways would inform secure access device 120 of expected variations based on placement of the accelerometers 330 on access card 110. In further embodiments, access card 110 may have multiple accelerometers 330 positioned to account for these variations. In other embodiments, secured access device 120, when determining the identifying gesture, may take input from multiple accelerometers 330, and calculate a single gesture. In some embodiments, the data from the multiple accelerometers 330 may be equally weighted. In other embodiments, the data from accelerometers 300 may be weighted differently.

In other embodiments, user 140 will have the opportunity to configure their identifying gesture and test to make sure that they can repeatably perform their gesture and be authenticated. For example, after configuring their gesture, user 140 may have the opportunity to confirm that they can successfully authenticate their identity by performing their gesture in a testing context. For example, user 140 may perform their gesture any number of times to confirm that the gesture is correctly configured. In addition, user 140 may test that the gesture is correctly configured by performing a different gesture and failing to authenticate.

In various embodiments, secured access device 120 may be associated with a home security system. For example, user 140 may disarm a home security system by performing the identifying gesture with access card 110.

The disclosed embodiments provide improvements to multi-factor authentication by using accelerations derived from a gesture that only an authorized user knows for authentication. Specifically, in the context of secured access using access cards, the disclosed embodiments provide improvements by adding a biometric factor as an extra layer of security to the functioning of the access card. For example, knowledge and inherence factors are added to the traditional access card system. Specifically, an authorized user of the access card has knowledge of their authenticating gesture. In addition to knowledge, performance of the gesture is inherent to the user. As mentioned above, no two persons are built or move exactly the same and, therefore, the accelerations associated with particular gestures are unique to each person. The disclosed systems and methods can take advantage of this reality by incorporating the performance of gestures into a multi-factor authentication. Instead of one factor authentication, possession, associated with simply swiping an access card in a card reader to gain access, the disclosed embodiments combine knowledge and inherence factors into the access card. A card holder must know what gesture is performed for access and the card holder must be able to physically perform the gesture.

Additionally, because the access cards do not need to be swiped or otherwise contacted with a card reader, the disclosed access cards are not exposed to the amount of wear and tear as a traditional access card when swiping or otherwise contacting a card reader.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software Moreover, while illustrative embodiments have been described herein, the scope includes any and all embodiments having equivalent elements, modifications, omissions, combinations (e.g., of aspects across embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for generating a reference pattern for authentication, comprising:
   one or more memory devices storing instructions; and
   one or more processors remote from an access card, the one or more processors executing the instructions to perform operations comprising:
   receiving first acceleration data from an accelerometer of the access card;
   detecting a first acceleration, based on the first acceleration data;
   normalizing the first acceleration, based on a particular placement of the accelerometer on the access card;
   determining a first identifying pattern based on the normalized first acceleration; and
   storing the first identifying pattern as a reference pattern for authenticating an identity of a user.

2. The system of claim 1, wherein the operations further comprise:
   receiving second acceleration data from an accelerometer of the access card;
   detecting a second acceleration, based on the second acceleration data;
   normalizing the second acceleration based on a coordinate system of the normalized first acceleration;
   determining a second identifying pattern, based on the normalized second acceleration;
   comparing the second identifying pattern and the reference identifying pattern; and
   authenticating the identity of the user based on a result of the comparison.

3. The system of claim 2, wherein authenticating the identity of the user comprises at least one of approving a financial transaction, gaining secured access, or sending confidential information.

4. The system of claim 2, wherein the operations further comprise prompting the user to perform a gesture for authentication.

5. The system of claim 4, wherein prompting the user to perform a gesture comprises prompting the user to draw at least one of a shape, a signature, or a code word.

6. The system of claim 1, wherein:
   the operations further comprise filtering the first acceleration data; and
   detecting the first acceleration comprises detecting the first acceleration, based on the filtered first acceleration data.

7. The system of claim 1, wherein the operations further comprise storing a plurality of reference identifying patterns, each reference identifying pattern being associated with a different user.

8. The system of claim 1, wherein the operations further comprise communicating with the access card via a near-field communication component.

9. The system of claim 1, wherein the operations further comprise prompting the user to perform a gesture to configure a reference identifying pattern.

10. The system of claim 1, wherein the operations further comprise:
    receiving information relating to the particular placement of the accelerometer on the access card.

11. A method for generating a reference pattern for authentication, comprising:
    receiving first acceleration data from an accelerometer of an access card;
    detecting a first acceleration, based on the first acceleration data;
    determining a particular placement of the accelerometer on the access card;
    normalizing the first acceleration, based on the particular placement of the accelerometer;
    determining a first identifying pattern, based on the normalized first acceleration; and
    storing the first identifying pattern as a reference pattern for authenticating an identity of a user.

12. The method of claim 11, further comprises:
    receiving second acceleration data from an accelerometer of the access card;
    detecting a second acceleration, based on the second acceleration data;
    normalizing the second acceleration into a coordinate system of the normalized first acceleration;
    determining a second identifying pattern, based on the normalized second acceleration;
    comparing the second identifying pattern and the reference identifying pattern; and
    authenticating the identity of the user based on a result of the comparison.

13. The method of claim 12, wherein authenticating the identity of the user comprises at least one of approving a financial transaction, gaining secured access, or sending confidential information.

14. The method of claim 12, further comprising prompting the user to perform a gesture for authentication.

15. The method of claim 14, wherein prompting the user to perform a gesture comprises prompting the user to draw at least one of a shape, a signature, or a code word.

16. The method of claim 11, wherein:
    the method further comprises filtering the first acceleration data; and
    detecting the first acceleration comprises detecting the first acceleration, based on the filtered first acceleration data.

17. The method of claim 11, wherein the method further comprises storing a plurality of reference identifying patterns, each reference identifying pattern being associated with a different user.

18. The method of claim 11, wherein the method further comprises communicating with the access card via a near-field communication component.

19. The method of claim 11, wherein the method further comprises prompting the user to perform a gesture to configure a reference identifying pattern.

20. A non-transitory computer-readable storage medium storing instructions which, when executed by one or more processors, cause the one or more processors to perform operations comprising:
- receiving acceleration data from an accelerometer of an access card;
- detecting an acceleration, based on the acceleration data;
- normalizing the acceleration, based on a particular placement of the accelerometer on the access card;
- determining an identifying pattern, based on the normalized acceleration; and
- storing the identifying pattern as a reference pattern for authenticating an identity of a user.

* * * * *